M. C. KRUSE.
WATER HEATER.
APPLICATION FILED MAR. 25, 1914.

1,126,230.

Patented Jan. 26, 1915.

WITNESSES:
George Nash
Hattie Hoctor

INVENTOR
Martinez C. Kruse
BY
Mercer D. Blondel,
ATTORNEY

THE NORRIS PETERS CO., PHOTO-LITHO., WASHINGTON, D. C.

UNITED STATES PATENT OFFICE.

MARTINEZ CHRISTIAN KRUSE, OF BRIDGEPORT, CONNECTICUT.

WATER-HEATER.

1,126,230.     Specification of Letters Patent.     Patented Jan. 26, 1915.

Application filed March 25, 1914. Serial No. 827,022.

*To all whom it may concern:*

Be it known that I, MARTINEZ CHRISTIAN KRUSE, a citizen of the United States, residing at Bridgeport, in the county of Fairfield and State of Connecticut, have invented certain new and useful Improvements in Water-Heaters, of which the following is a specification.

The object of the invention is to provide a cheap, simple and efficient apparatus for heating water instantaneously at minimum cost, the invention being particularly designed for domestic use, and in places such as barber shops, factories, and the like, where hot water is required at intervals of time and on short notice.

The invention consists in a cylindrical casing or tank having a partition arranged therein adjacent to its upper end providing upper and lower water compartments, the lower compartment having a plurality of truncated conical tubes which are closed at their upper ends and open at their lower ends, forming hot air-pockets, the said partition having series of small perforations which are arranged immediately adjacent to and surrounding the upper ends of the tubes and which permit water to escape from the upper compartment into the lower compartment down along the outer surfaces of the tubes. These and other features germane thereto constitute the invention as will be hereafter fully described and then claimed.

Figure 1:
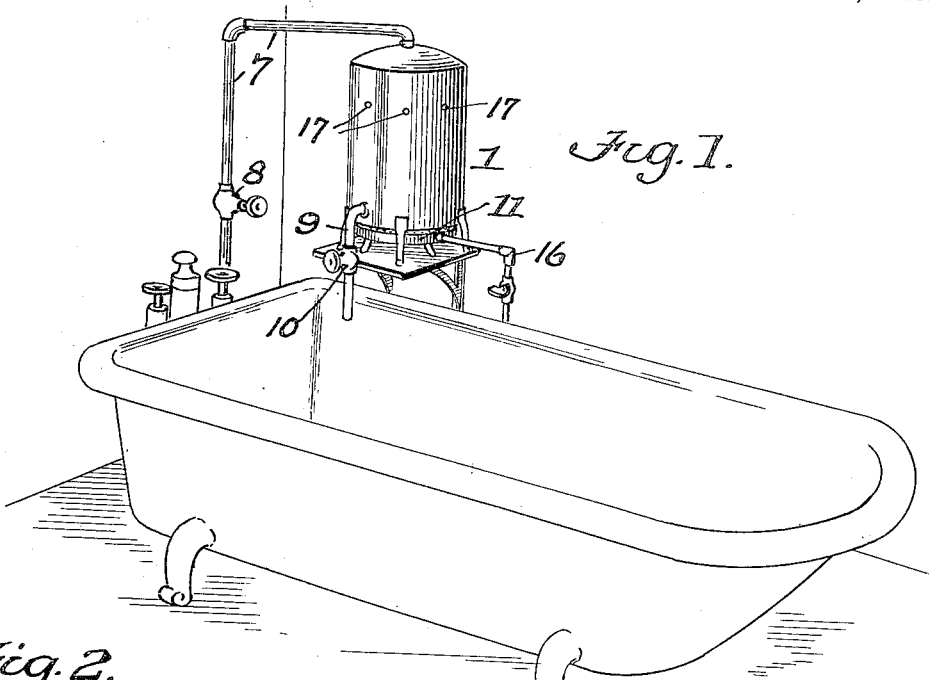
Figure 2:
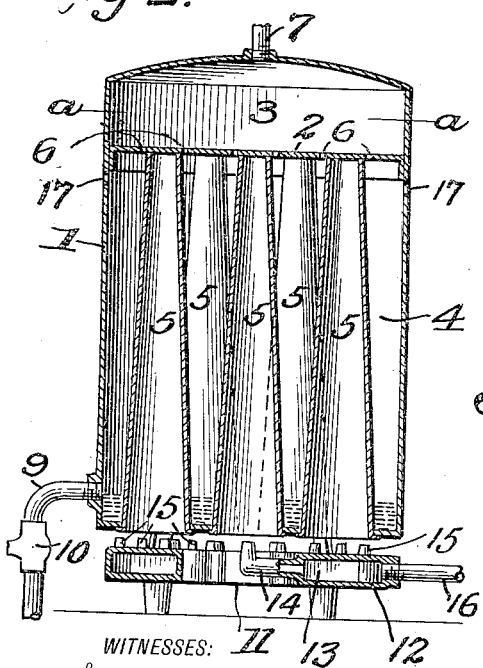
Figure 3:
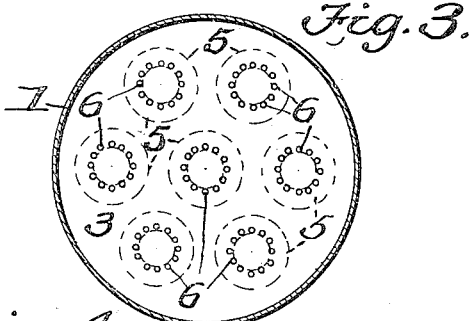
Figure 4:
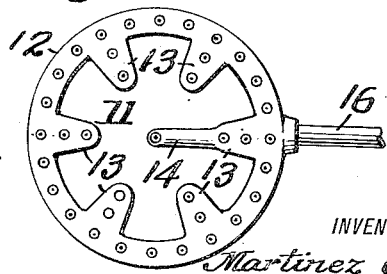

In the accompanying drawing, illustrating the invention, in the several figures of which like parts are similarly designated, Figure 1 is a perspective view illustrating one use of the invention. Fig. 2 is a vertical longitudinal section drawn through the casing or tank and through the gas burner or heater. Fig. 3 is a horizontal section drawn on the line *a—a* of Fig. 2. Fig. 4 is a plan view of the gas burner.

1 designates a cylindrical casing or tank closed at its upper and lower ends and having a horizontal partition 2 adjacent to its upper end which divides the casing or tank into an upper water compartment or reservoir 3 and a lower hot water compartment 4. Arranged in the compartment 4, and opening through the bottom thereof are a plurality of truncated conical tubes 5 which are closed at their upper ends preferably by the partition 2, to which the said ends are connected, providing a plurality of hot air-pockets. The partition 2 is provided with series of perforations 6, Fig. 3, which surround the upper ends of the tubes 5. Water is led into the upper compartment or reservoir 3 through a supply pipe 7 controlled by a suitable valve 8, and water is drawn from the lower compartment through a discharge spigot 9 controlled by valve 10.

11 designates the gas burner which is constructed of a hollow circular ring 12, preferably rectangular in cross-section, from the inner surface of which extends a series of hollow lugs 13 which are arranged to lie directly under the lower end of the tubes 5 when the burner is in position under the casing. One of the hollow lugs is formed with an extension 14 which terminates at its outer end in an up-turned burner, and the cylindrical ring and the lugs are provided with burners 15 as shown. 16 designates a supply pipe.

The casing is provided immediately below the partition 2 with a series of small openings 17 to permit the escape of steam from the lower compartment 4 when the water reaches a boiling point, and which also serve as vents to permit the escape of air from the lower compartment as the water enters through the perforations 6.

It will be observed that the delivery spigot 9 is arranged above the bottom of the casing or tank so that a small quantity of water always remains in the lower compartment to thus prevent the bottom of the receptacle and the lower ends of the tubes from being burned when the gas is first lighted and before the water is let into the reservoir 3.

In operation the gas is lighted and the tubes allowed to become hot, water is then admitted to the upper compartment or reservoir 3 from which it escapes into the lower compartment through the perforation 6 which direct the small streams or drops against the sides of the said tubes down which the streams or drops run, thus thoroughly heating the water, you may say, as it enters the lower compartment. Immediately after the water is admitted to the upper compartment or reservoir, the discharge spigot is open to permit the hot water to run out. It will thus seem that the operation is extremely simple and that the invention will be found useful particularly in kitchens, bath-rooms, barber shops and such places where it is often desirable or necessary to heat water in comparatively small quantities at short notice.

I am aware that water heating devices constructed with tubes have been devised, but these devices have been found more or less impracticable since the tubes or flues are open at their upper ends which permit the heated air to escape, hence necessitating much longer time to heat the water than with my apparatus, since I close the upper end of the tubes and thereby retain the heat, thus provide hotter contacting surfaces for the water which consequently enables me to thoroughly heat the same in a shorter time than with other devices heretofore employed, and at considerably less cost.

What I claim is:

1. A water heater, comprising a casing, a partition arranged therein, a series of heating tubes extending upwardly from the bottom of casing to said partition, the upper ends of said tubes being closed by said partition, said partition being perforated, means for introducing liquid above said partition, and means for withdrawing liquid from the casing at a point above the bottom of casing.

2. A water heater, comprising a casing, a partition arranged therein, a series of conical heating tubes extending upwardly from the bottom of casing to the partition, said partition closing the upper ends of said tubes, said partition being perforated adjacent the upper ends of said tubes, means for introducing liquid into the upper part of casing and means for withdrawing liquid from the lower part of casing.

3. A water heater, comprising a casing, a partition arranged therein, said partition being perforated, a series of conical heating tubes open at their lower ends and closed at their upper ends, said upper ends contacting with the partition, means for introducing water into the upper part of casing and means for withdrawing water from the lower part of the casing.

In testimony whereof I have hereunto set my hand this 23rd day of March, A. D. 1914.

MARTINEZ CHRISTIAN KRUSE.

Witnesses:
JAMES A. PEASE,
HATTIE HOCTOR.

Copies of this patent may be obtained for five cents each, by addressing the "Commissioner of Patents, Washington, D. C."